US010434658B2

(12) United States Patent
Gu et al.

(10) Patent No.: US 10,434,658 B2
(45) Date of Patent: Oct. 8, 2019

(54) MASSAGE ROBOT USING MACHINE VISION

(71) Applicant: MIDEA GROUP CO., LTD, Foshan (CN)

(72) Inventors: Haisong Gu, Cupertino, CA (US); Dongyan Wang, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/826,569

(22) Filed: Nov. 29, 2017

(65) Prior Publication Data

US 2019/0160684 A1 May 30, 2019

(51) Int. Cl.

| | |
|---|---|
| ***G06K 9/00*** | (2006.01) |
| ***B25J 11/00*** | (2006.01) |
| ***B25J 9/16*** | (2006.01) |
| ***B25J 9/00*** | (2006.01) |
| ***B25J 13/00*** | (2006.01) |

(Continued)

(52) U.S. Cl.

CPC ............ *B25J 11/009* (2013.01); *A61H 39/02* (2013.01); *B25J 9/0003* (2013.01); *B25J 9/1697* (2013.01); *B25J 11/0005* (2013.01); *B25J 13/006* (2013.01); *G06K 9/00255* (2013.01); *G06T 7/73* (2017.01); *A61H 2201/5058* (2013.01); *A61H 2201/5082* (2013.01); *A61H 2201/5097* (2013.01); *G06T 2207/30201* (2013.01); *Y10S 901/09* (2013.01); *Y10S 901/10* (2013.01)

(58) Field of Classification Search

CPC ...... B25J 11/009; B25J 9/0003; B25J 9/1697; B25J 11/0005; B25J 13/006; G06T 7/73; G06T 2207/30201; A61H 2201/5058; A61H 2201/5082; A61H 2201/5097; A61H 39/02; Y10S 901/09; Y10S 901/10; G06K 9/00255

See application file for complete search history.

(56) References Cited

U.S. PATENT DOCUMENTS 6,585,668 B2 * 7/2003 Nissim .................. A61H 7/001
601/103
6,721,444 B1 4/2004 Gu et al.

(Continued)

FOREIGN PATENT DOCUMENTS

CN 101884585 A 11/2010
CN 103800166 A 5/2014

(Continued)

OTHER PUBLICATIONS

PCT International Search Report and Written Opinion, PCT Application No. PCT/CN2018/114024, dated Feb. 13, 2019, 12 pages.

*Primary Examiner* — Xin Jia

(74) *Attorney, Agent, or Firm* — Morgan, Lewis & Bockius LLP

(57) ABSTRACT

A massage robot uses machine vision to locate treatment spots for massage. In one approach, a massage robot includes one or more robotic arms, an image sensor and a control system. The image sensor captures images of the user. The control system includes an image processing module and a motion controller. The image processing module processes the images to locate a treatment spot on the user. The motion controller controls the robotic arm to perform a massage procedure on the identified treatment spot.

18 Claims, 4 Drawing Sheets

(51) Int. Cl.

| | |
|---|---|
| ***A61H 39/02*** | (2006.01) |
| ***G06T 7/73*** | (2017.01) |

(56) References Cited

U.S. PATENT DOCUMENTS

| | | | | |
|---|---|---|---|---|
| 2017/0266077 | A1* | 9/2017 | Mackin | A61H 15/0078 |
| 2018/0250072 | A1* | 9/2018 | Rogers | A61N 5/0625 |
| 2018/0311815 | A1* | 11/2018 | Shaw | B25J 9/161 |

FOREIGN PATENT DOCUMENTS

| | | | |
|---|---|---|---|
| CN | 103908390 | A | 7/2014 |
| CN | 106901941 | A | 6/2017 |
| CN | 107095510 | A | 8/2017 |
| JP | H06209 | A | 1/1994 |

* cited by examiner

MASSAGE ROBOT USING MACHINE VISION

BACKGROUND

1. Technical Field

This disclosure relates generally to massage robots.

2. Description of Related Art

Many people enjoy receiving massage and enjoy the health benefits of massage. However, in most cases, people receive massage at a massage parlor or other type of studio. To do this, people typically must make appointments in advance, must leave their homes and travel to the studio and must spend time to find a good studio and masseuse. If the studio closes or the masseuse leaves, the person must start over and find another acceptable provider of massage treatment. Treatments and their quality may also vary from one studio to the next, and even between masseuses within a studio. In addition, if the person is not using the same masseuse and studio on a regular basis, there may be no past history about the person and his massage treatments, and the masseuse may not perform massage according to the person's personal preferences or to address the person's specific idiosyncrasies or problem spots.

Thus, there is a need for better and more convenient approaches to provide massage.

SUMMARY

The present disclosure overcomes the limitations of the prior art by providing a massage robot that uses machine vision to locate treatment spots for massage. In one approach, a massage robot includes one or more robotic arms, an image sensor and a control system. The image sensor captures images of the user. The control system includes an image processing module and a motion controller. The image processing module processes the images to locate a treatment spot on the user. The motion controller controls the robotic arm to perform a massage procedure on the identified treatment spot.

The massage can be personalized by selecting the massage procedure based on the identity of the user, for example based on the user's past history of massages, on the user's personal preferences or on instructions from a massage professional treating the user.

Sensors other than machine vision can also be used. Examples include ultrasound sensors, touch sensors, pressure sensors, and temperature sensors. In some designs, the robotic arm can be fitted with different end effectors, which are selected based on the desired massage procedure.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
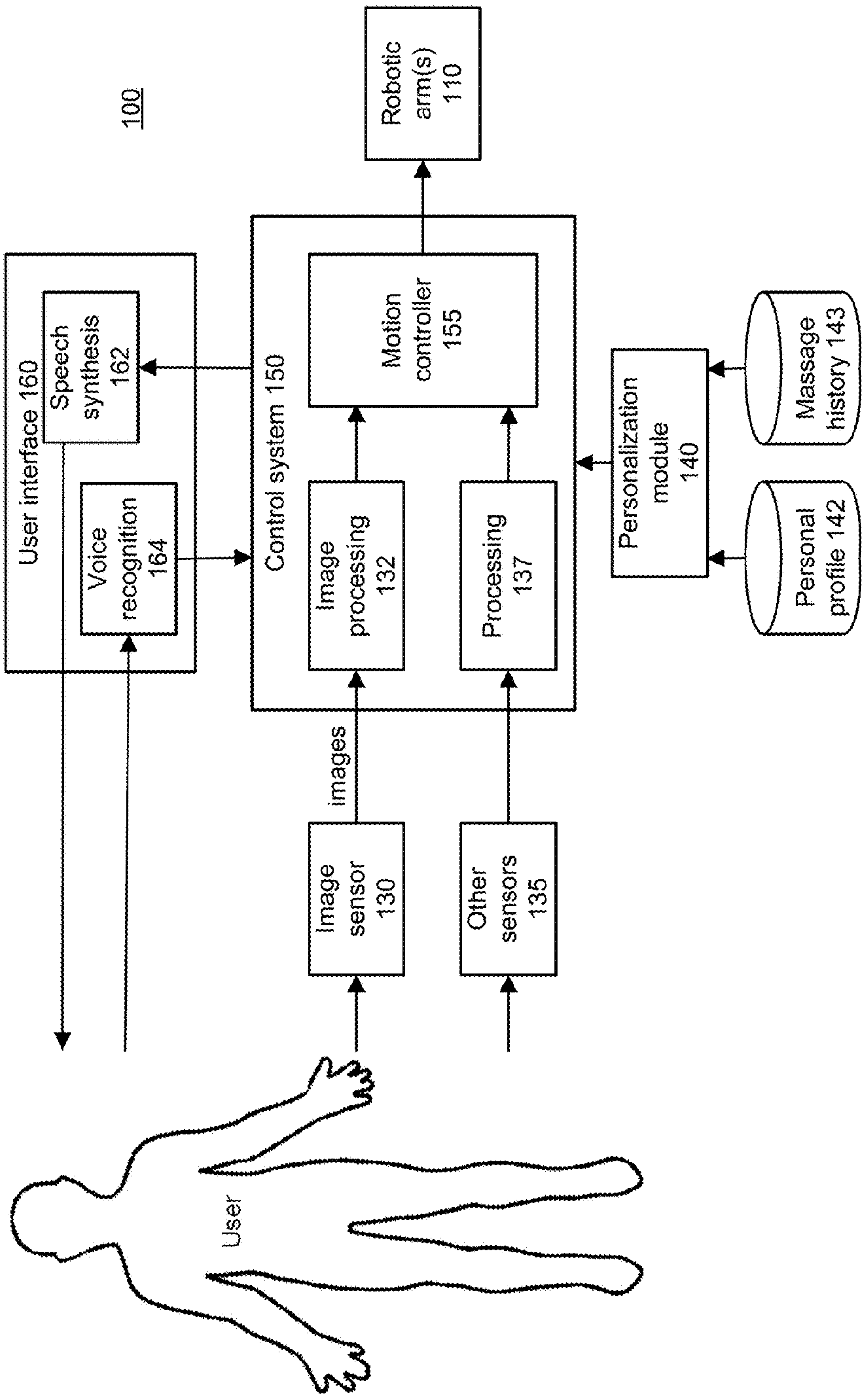
FIG. 1 is a block diagram of a massage robot, according to an embodiment.

FIG. 1 is a block diagram of a massage robot 100, according to an embodiment. The robot 100 has one or more robotic arms 110 which are guided by a control system 150 that uses machine vision to identify a treatment spot for the massage procedure. In FIG. 1, the massage robot 100 includes an image sensor 130 (e.g., a camera), an image processing module 132 and a motion controller 155. The image sensor 130 captures images of the user—the person receiving the massage. The image processing module 132 processes these images to locate the treatment spot, and the motion controller 155 controls the robotic arm 110 to perform the desired massage procedure on the identified treatment spot.

Different types of robotic arms can be used, with different degrees of freedom. Typically, the robotic arm will have from 3-7 degrees of freedom. Example degrees of freedom include shoulder, elbow, wrist, finger/hand manipulators, and telescoping upper arm or forearm. If the robotic arm can be fitted with different end effectors, the control system 150 may also select the appropriate end effector and control the robotic arm to automatically change to the correct end effector. Examples of end effectors include those with fingers (typically from one to five, with or without thumb) or pad without fingers.

The massage robot 100 may also include other sensors 135. Examples include an ultrasound sensor to capture ultrasound images, a pressure sensor to sense the pressure exerted by the robotic arm on the treatment spot, a touch sensor to detect the hardness or firmness of the treatment spot, and a temperature sensor to detect the temperature of the treatment spot. Information from these sensors can also be processed 137 by the control system 150 and used by the motion controller 155 to control the robotic arm.

A personalization module 140 is used to personalize the massage procedure for the user. It first identifies the user. For example, the user may be identified when he logs into his user account for the massage robot or for a home network connected to the robot. Alternately, the user may be identified by face recognition or other techniques. Once the user is identified, the personalization module 140 determines the appropriate massage procedure based on the user's identity. For example, the massage procedure may be selected based on the user's profile 142. Perhaps the user has specified certain types of massage on specific days of the week. Alternately, the massage procedure may be defined by a massage professional treating the user. The professional's instructions specifying certain types of massage for the user may be stored somewhere and retrieved by the massage robot 100.

Alternately, the massage robot 100 may determine or suggest a massage procedure based on the user's prior history 143 of massages. If in the past the user has received upper back massage on Tuesday and Thursday and whole body massage on Saturday, and today is Saturday, then the massage robot 100 may assume whole body massage or may ask the user whether he would like a whole body massage. The massage procedure may also be selected based on the user's medical record, such as a record of back pain at certain locations.

The massage procedure may also be determined based on the user's pose. If the user is lying face down with exposed back, legs and arms, the massage robot 100 may determine that the user would like a whole body massage. If the user is sitting with back facing the robot 100, the robot may determine that some sort of back massage is appropriate.

Returning to FIG. 1, the massage robot 100 also includes a user interface 160, which in this example includes speech synthesis 162 and voice recognition 164. The speech synthesis module 162 is used to give instructions and otherwise communicate to the user. The voice recognition module 164 is used to receive voice commands or other communications.

Figure 2:
FIG. 2 shows a user receiving a massage from a mobile, home assistant robot.

FIG. 2 shows an example of a massage robot 200 preparing to deliver a massage to a user. Jane User comes home from work on Wednesday, sits down to watch TV and asks her home robot assistant for a beer. In this example, the massage robot is a mobile, more general purpose home assistant robot. In addition to providing massage, the robot can also perform other household tasks, such as cleaning, retrieving items, organizing and putting away items.

User: "Assistant, may I please have a beer?"

Assistant retrieves a beer from the refrigerator and delivers it to User. Assistant's camera captures images of User, and determines that she is sitting in her favorite chair and watching TV. Assistant also knows that User has requested a beer. Based on this pattern and User's past history, Assistant asks, "I see today is Wednesday and you look tired. Would you like a back massage?"

User: "Yes. That would be good."

Assistant: "Please move to the massage chair and prepare for back massage."

User moves to the massage chair, where her face is facing the chair back and her back is exposed.

Assistant determines from its captured images that User is sitting in the massage chair and that the back is exposed ready for massage, but the pose is not quite right. Assistant instructs, "Please sit straight and move slightly to the left." Assistant also determines that User is still drinking beer. Assistant warns, "Drinking while receiving massage is not recommended. Please put down your beer."

User follows Assistant's instructions. Assistant determines that User's pose is now ready for massage. From User's profile and past history, Assistant selects a general 15-minute massage of the upper back and also notices that User recently has had an especially tight right trapezius. Assistant: "I will perform your usual upper back massage. Is your right side still bothering you?"

User: "15-minute back massage is fine. My right side is not painful, but still tight. Better than last time."

Assistant begins the massage of the upper back. The vision system guides the end effector of the robotic arm to carry out a specific pattern of massage and/or to address specific problem areas. The image processing module 132 determines the location of the upper back, possibly including anatomical landmarks such as the spinal column, neck and trapezius muscles. Massage is applied to different treatment spots based on the captured images. The massage may be applied with different size pressure areas and different amounts of pressure. The motion controller 155 preferably controls the location of the massage, the pressure of the massage, and the speed and/or length of massage strokes.

In this example, Assistant changes the end effector of the robotic arm to a long broad end effector and begins the massage by applying massage oil to User's back and stroking from the spine outwards in order to emulate a general back massage by a masseuse's forearm.

Assistant then changes to a tennis-ball sized end effector with more of a pressuring motion rather than a stroking motion to emulate pressure by a masseuse's palm. The amount of pressure is based on the pressures recorded for User's last massage. Assistant works a pattern of palm pressures across User's back. During this pattern, sensors in the end effector detect a small knot on the left side and note the location for later treatment. As another example where the massage robot itself may detect problem areas, if the image sensor is a thermal camera, the image processing module 132 may process the thermal images to identify unusually hot spots or temperature peaks for treatment.

Assistant then changes to a smaller size end effector to emulate a more localized pressure massage by fingers and thumbs. Assistant starts by applying pressure to both sides of the spinal column, working up and down the spinal column. It then massages specific spots, including the identified knot. Assistant applies concentrated pressure to the knot area. User yells, "Ouch. That hurts."

Assistant stops and asks, "Is that too much pressure?"

User: "No. It is okay. Just a little sensitive."

Assistant continues with the same amount of pressure, but with more of a kneading motion rather than just direct pressure.

Assistant: "How is that?"

User: "Better. Thank you."

Assistant: "I am going to add some heat. OK?"

User: "OK."

Assistant increases the temperature of the end effector and finishes treatment of the knot in this manner. In some cases, the massage time may be a predetermined time period: five minutes for example. Alternately, the Assistant may massage the knot until sensors indicate the knot has been released or until User instructs the Assistant to stop.

Assistant then moves to the right trapezius. Assistant changes to opposing end effectors. The opposing end effectors may be either on the same robotic arm or on different robotic arms. Opposing end effectors may be used to emulate pinching or squeezing motions. Assistant uses the opposing end effectors to massage the right trapezius.

When this part of the procedure is completed, Assistant states, "Massage is completed." User replies, "Good. Thanks."

Figure 3:
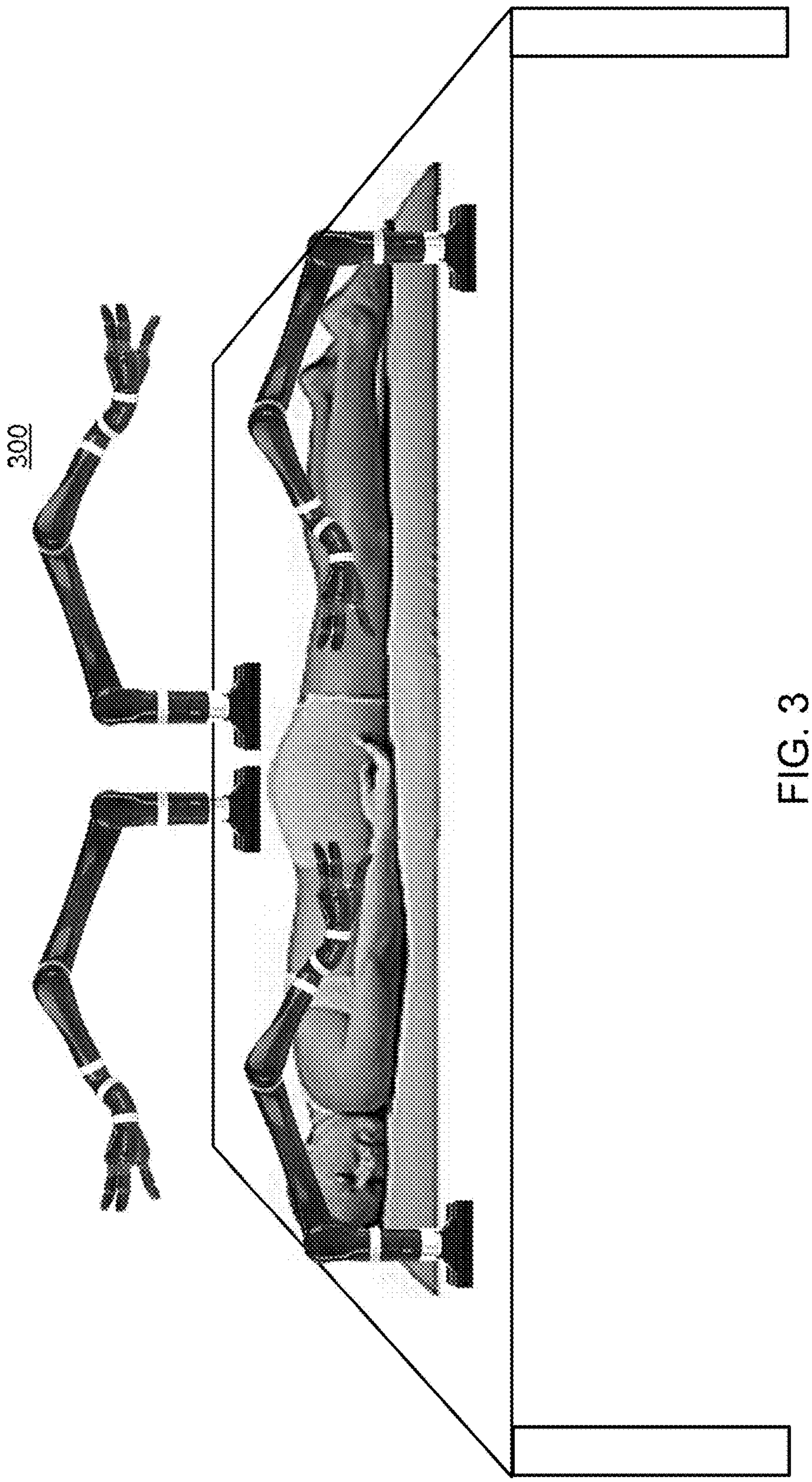
FIG. 3 shows a user receiving a massage from a robot fixed to a massage table.

FIG. 3 shows another example. In this example, the massage robot 300 is stationary. It includes a set of robotic arms that are stationary relative to a massage table. The user lies on the massage table and the robotic arms perform the massage. The arms may work simultaneously, with different arms performing different procedures. For example, some arms may provide massage for the back while others provide massage of the legs or arms. Alternately, some arms may provide general massage of an area while others massage specific treatment spots. The massage robot 300 may be used in professional settings, such as at a massage studio or doctor's office, in addition to providing home massage.

Figure 4:
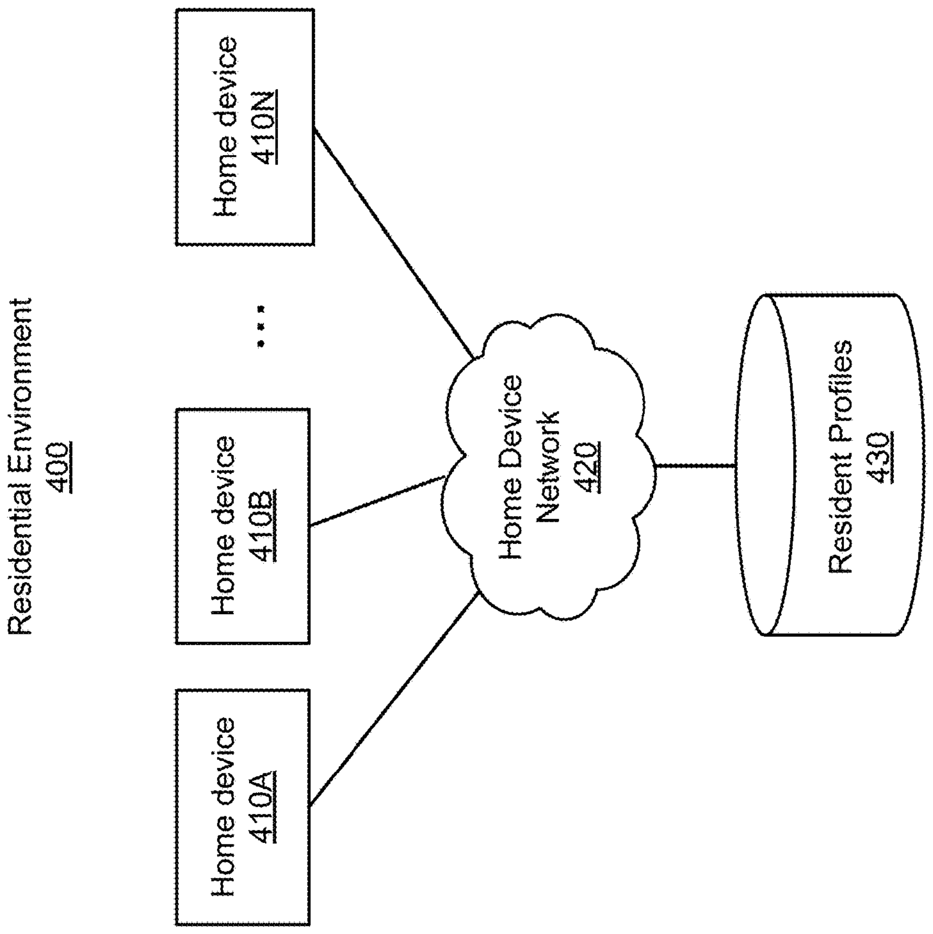
FIG. 4 is a block diagram of a residential environment including a massage robot, according to an embodiment.

In another aspect, the massage robot may be part of a home network. FIG. 4 is a block diagram of a residential environment that includes a massage robot, according to an embodiment. The residential environment 400 is an environment designed for people to live in. The residential environment 400 can be a dwelling, such as a house, a condo, an apartment, or a dormitory. The residential environment 400 includes home devices 410A-N, including the massage robot described above. It also includes a home device network 420 connecting the home devices 410, and a resident profiles database 430 that contains residents' preferences for the home devices. The components in FIG. 4 are shown as separate blocks but they may be combined depending on the implementation. For example, the resident profiles 430 may be part of the home devices 410. Also, the residential environment 400 may include a hub for the network 420. The hub may also control the home devices 410. The network 420 may also provide access to external devices, such as cloud-based services.

The home devices 410 are household devices that are made available to the different persons associated with the residential environment 400. Examples of other home devices 410 include HVAC devices (e.g., air conditioner, heater, air venting), lighting, powered window and door treatments (e.g., door locks, power blinds and shades), powered furniture or furnishings (e.g., standing desk, recliner chair), audio devices (e.g., music player), video device (e.g., television, home theater), environmental controls (e.g., air filter, air freshener), kitchen appliances (e.g., rice cooker, coffee machine, refrigerator), bathroom appliances, and household robotic devices (e.g., vacuum robot, robot butler). The home devices 410 can include other types of devices that can be used in a household.

The resident profiles 430 typically include information about the different residents, such as name, an identifier used by the system, age, gender, and health information. The resident profiles 430 can also include settings and other preferences of the home devices 410 selected by the different residents.

The network 420 provides connectivity between the different components of the residential environment 400 and allows the components to exchange data with each other. The term "network" is intended to be interpreted broadly. It can include formal networks with standard defined protocols, such as Ethernet and InfiniBand. In one embodiment, the network 420 is a local area network that has its network equipment and interconnects managed within the residential environment 400. The network 420 can also combine different types of connectivity. It may include a combination of local area and/or wide area networks, using both wired and/or wireless links. Data exchanged between the components may be represented using any suitable format. In some embodiments, all or some of the data and communications may be encrypted.

The functionality described above can be physically implemented in the individual massage robot (one of the home devices 410), in a central hub for the home network, in a cloud-based service or elsewhere accessible by the massage robot via the network 420, or in combinations of any of the above.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures.

What is claimed is:

1. A massage robot for providing massage to a user, the massage robot, comprising:
- a robotic arm;
- an image sensor that captures images of the user; and
- a control system comprising one or more processors and memory including instructions that when executed by the one or more processors implement:
  - an image processing module that processes the images to locate a treatment spot on the user, and
  - a motion controller that controls the robotic arm to perform a massage procedure on the identified treatment spot,
- wherein the control system is configured to:
  - determine a current pose of the user in accordance with the images of the user captured by the image sensor,
  - in accordance with a determination that the current pose of the user is a first type of pose, select a first type of massage to be applied on the user using the robot arm, and
  - in accordance with a determination that the current pose of the user is a second type of pose, distinct from the first type of pose, select a second type of massage, distinct from the first type of massage, to be applied on the user using the robot arm.

2. The massage robot of claim 1, wherein the massage robot further includes a personalization module that identifies the user and determines the massage procedure based on a history of past massage procedures performed on the identified user.

3. The massage robot of claim 1, wherein the massage robot further includes a personalization module that identifies the user and determines the massage procedure based on stored instructions from a massage professional treating the identified user.

4. The massage robot of claim 1, wherein the image processing module determines whether the user is ready for the massage procedure based on the user's current pose, and the control system determines whether to begin the massage procedure depending on whether the user is ready for the massage procedure, and the message robot further includes a speech synthesis module, wherein the control system controls the speech synthesis module to, in accordance with the current pose of the user, produce voice instructions instructing the user to adjust the current pose of the user in a respective manner to get ready for the massage procedure.

5. The massage robot of claim 1, wherein the image processing module processes the images to identify body parts of the user and identifies the treatment spot on a relevant body part among the identified body parts of the user.

6. The massage robot of claim 1, further comprising:

an ultrasound sensor, wherein the motion controller controls the robotic arm according to signals from the ultrasound sensor.

7. A method for controlling a massage robot for providing massage to a user, wherein the massage robot has a robotic arm and an image sensor that captures images of the user, and the method comprises:

at a control system comprising one or more processors and memory:

processing the images to locate a treatment spot on the user;

controlling the robotic arm to perform a massage procedure on the identified treatment spot on the user, including:

determining a current pose of the user in accordance with the images of the user captured by the image sensor;

in accordance with a determination that the current pose of the user is a first type of pose, selecting a first type of massage to be applied on the user using the robot arm; and in accordance with a determination that the current pose of the user is a second type of pose, distinct from the first type of pose, selecting a second type of massage, distinct from the first type of massage, to be applied on the user using the robot arm.

8. The method of claim 7, including:

identifying the user; and determining the massage procedure based on a history of past massage procedures performed on the identified user.

9. The method of claim 7, including:

identifying the user; and determining the massage procedure based on stored instructions from a massage professional treating the identified user.

10. The method of claim 7, including:

determining whether the user is ready for the massage procedure based on the user's current pose;

determining whether to begin the massage procedure depending on whether the user is ready for the massage procedure; and in accordance with the current pose of the user, producing voice instructions instructing the user to adjust the current pose of the user in a respective manner to get ready for the massage procedure.

11. The method of claim 7, including:

processing the images to identify body parts of the user; and identifying the treatment spot on a relevant body part among the identified body parts of the user.

12. The method of claim 7, wherein the massage robot includes an ultrasound sensor, and the method includes:

controlling the robotic arm according to signals from the ultrasound sensor.

13. A non-transitory computer-readable storage medium for controlling a massage robot for providing massage to a user, wherein:

the massage robot has a robotic arm and an image sensor that captures images of the user, and the computer-readable storage medium includes instructions, which when executed by one or more processors of a control system, cause the processors to perform operations comprising:

processing the images to locate a treatment spot on the user;

controlling the robotic arm to perform a massage procedure on the identified treatment spot on the user, including:

determining a current pose of the user in accordance with the images of the user captured by the image sensor;

in accordance with a determination that the current pose of the user is a first type of pose, selecting a first type of massage to be applied on the user using the robot arm; and in accordance with a determination that the current pose of the user is a second type of pose, distinct from the first type of pose, selecting a second type of massage, distinct from the first type of massage, to be applied on the user using the robot arm.

14. The computer-readable storage medium of claim 13, wherein the operations further include:

identifying the user; and determining the massage procedure based on a history of past massage procedures performed on the identified user.

15. The computer-readable storage medium of claim 13, wherein the operations further include:

identifying the user; and determining the massage procedure based on stored instructions from a massage professional treating the identified user.

16. The computer-readable storage medium of claim 13, wherein the operations further include:

determining whether the user is ready for the massage procedure based on the user's current pose;

determining whether to begin the massage procedure depending on whether the user is ready for the massage procedure; and in accordance with the current pose of the user, producing voice instructions instructing the user to adjust the current pose of the user in a respective manner to get ready for the massage procedure.

17. The computer-readable storage medium of claim 13, wherein the operations include:

processing the images to identify body parts of the user; and identifying the treatment spot on a relevant body part among the identified body parts of the user.

18. The computer-readable storage medium of claim 13, wherein the massage robot includes an ultrasound sensor, and the operations include:

controlling the robotic arm according to signals from the ultrasound sensor.

* * * * *